COMPUTER SHIFT CONTROL CIRCUITS

Original Filed March 4, 1955 5 Sheets-Sheet 1

INVENTORS.
GEORGE G. HOBERG
JOHN R. VAN ANDEL
EDWARD W. VEITCH
BY Raymond B. Parker
ATTORNEY INVENTORS.
GEORGE G. HOBERG
JOHN R. VAN ANDEL
EDWARD W. VEITCH
BY Raymond B. Parker
ATTORNEY INVENTORS.
GEORGE G. HOBERG
JOHN R. VAN ANDEL
EDWARD W. VEITCH
BY
Raymond B. Parker
ATTORNEY INVENTORS.
GEORGE G. HOBERG
JOHN R. VAN ANDEL
EDWARD W. VEITCH
BY Ralzemond B. Parker
ATTORNEY

COMPUTER SHIFT CONTROL CIRCUITS

Original Filed March 4, 1955 5 Sheets-Sheet 5

INVENTORS.
GEORGE G. HOBERG
JOHN R. VAN ANDEL
BY EDWARD W. VEITCH
Raymond B. Parker
ATTORNEY United States Patent Office 3,050,717 Patented Aug. 21, 1962

3,050,717
COMPUTER SHIFT CONTROL CIRCUITS

George G. Hoberg, Berwyn, John R. Van Andel, Bridgeport, and Edward W. Veitch, Rosemont, Pa., assignors to Burroughs Corporation, Detroit, Mich., a corporation of Michigan Original application Mar. 4, 1955, Ser. No. 492,062. Divided and this application Aug. 7, 1956, Ser. No. 602,654
10 Claims. (Cl. 340—174.1)

This application is divided from the co-pending United States application for patent entitled Electronic Computer System, S.N. 492,062, filed March 4, 1955. This invention relates to data storage systems useful in electronic computers, and more particularly to control circuits for shifting significant digits of arithmetic information in data storage and processing circuits.

In data storage systems including cyclic memory devices such as a magnetic drum, information is frequently stored in circulating circuit loops or "revolvers" including storage areas on the drum surface. In arithmetic systems of electronic computers such revolvers are frequently used as registers for retaining numbers which are used during certain arithmetic operations. In many of these arithmetic operations, such as multiplication, it becomes necessary to shift the position of significant digits such as decimal characters. Revolver systems are particularly advantageous in performing such shifting operations, as outlined in the U.S. Patent No. 2,716,159, issued to T. H. Flowers on August 23, 1955, and the Great Britain patent specification No. 727,926, published April 13, 1955. These patents indicate the manner of shifting data by introducing delay means in revolver systems for causing data precession when shifting is desired.

Certain problems, however, exist in attaining successful operation of magnetic drum revolver systems including selective alteration of data and incorporating delay circuits because of critical timing necessary to write signals exactly in the same position previously recorded data occupies. Thus, the spacing of heads along the record track must be adjusted to encompass, together with data in transit in the coupling circuits, an exact integral number of recorded spots. This operation is very costly since it must take place for every revolver track in view of slight changes in system delays and timing signal spacing on the record. Accordingly it is highly desirable to provide a system requiring only a single head adjustment. The provision of more than two heads in a revolver track may not be tolerated therefore since they require extremely careful alignment in all permutations and combinations of circuit paths and head adjustments. Furthermore, system timing must take into account and correct certain discrepancies such as may be introduced by changes of temperature or momentary changes in cyclic record speed.

Accordingly it is an object of the invention to provide improved revolver systems, which are capable of shifting the significant positions of recorded data signals.

It is another object of the invention to provide a revolver system operable with selective alteration techniques.

A further object of the invention is to provide improved and simplified data processing and control circuits useful in electronic computers.

In accordance with the invention, therefore, there is provided a magnetic drum revolver system operable to shift the significant position of recorded data in either direction in response to simplified control signals. In order to provide an economically feasible system, the revolver track employs a single read and write head spaced apart an integral number of recording spots along the track. Special timing and pulse shaping circuits are provided in order to permit selection alteration of previously recorded data even when the signal processing circuits contained in the revolver loop external to the drum are subjected to variations in signal delay.

The following description of the invention and its organization will point out in detail the foregoing and further features of advantage, particularly when considered with reference to the accompanying drawings, in which.

Figure 1:
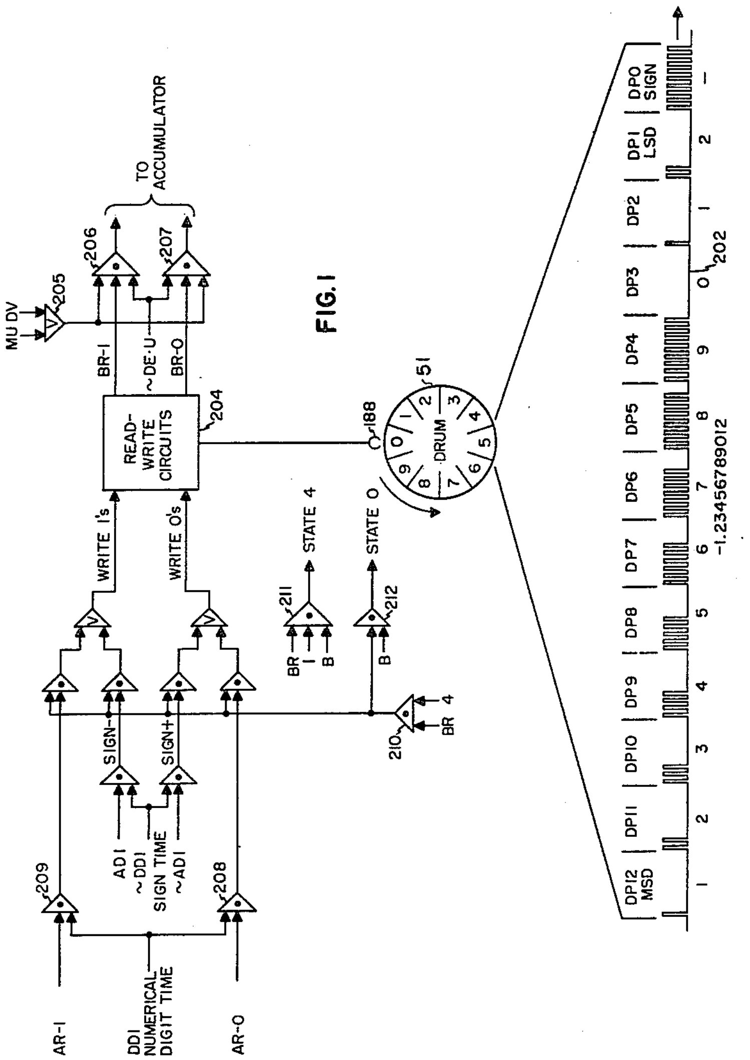
FIG. 1 is a logical schematic diagram of a magnetic drum read-write circuit illustrating the operation of the present invention.

In the rotating magnetic memory unit of FIG. 1, each data word has twelve decimal digits plus sign and is stored in serial form so that the sign may be read first and then the least significant digit, etc.

Each digit is stored in pulse-count form with 10 memory bit cells allocated for each digit. One of the bit cells termed a spacer cell is located between two successive digits and is not used for information storage. Since the digit zero requires no bits, the digits from zero through nine need only the remaining nine of the ten available bit cells.

A typical cyclically movable or rotating memory device is the magnetic drum 51, which is diagrammatically shown with associated word sectors 0 to 9. This magnetic drum when rotated at about 3600 r.p.m. provides a maximum access time for one track revolution of about seventeen milliseconds. Thus, the maximum access time for one of ten similar words stored in equidistant peripheral arcs or sectors around one track is about one and seven tenths milliseconds. The data memory may comprise several drum memory tracks, each storing ten words in the manner displayed by waveform 202.

Figure 5:
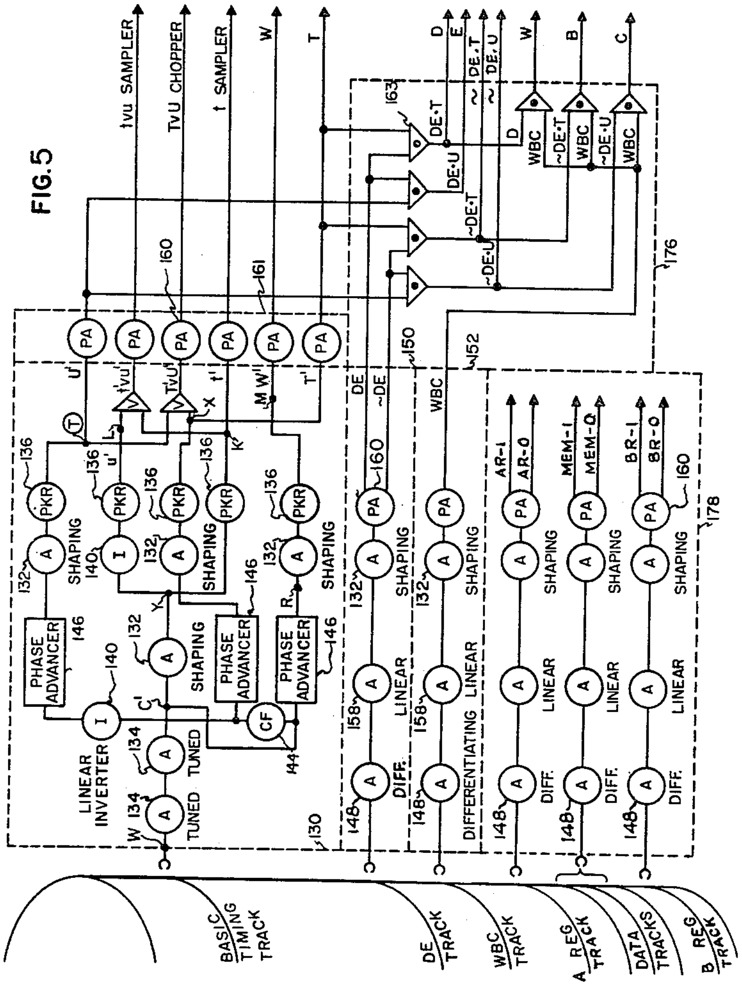
FIG. 5 is a logical schematic diagram of a timing signal processing system which may be used in accordance with the invention.

The drum is provided with an accumulator A register (A REG.) track shown in FIG. 5. The A REG. comprises a one word track located in a single sector, connected with an accumulator loop for re-entry of information which provides a maximum access time of about one and seven tenths milli-seconds from the start of the recirculating word. This track is connected in the accumulator loop to serve as an accumulator register in the manner illustrated schematically by FIGURES 2 and 3.

As shown in FIG. 5, three separate timing tracks are provided in the memory timing section on the drum for the bit, word, digit and rotation timing pulses. There are 1300 bit timing pulses on the basic track thus serving to produce a 78 kilocycle basic computer operating frequency. This provides for ten words of twelve decimal digits plus sign in the pulse-count notation on each track. The WBC track produces ten words pulses W and one each B and C rotation pulses, which are distinguished in the manner shown in the timing chart explained hereinafter in connection with FIGS. 4 and 5. The DE timing track provides 130 digit pulse pairs for each drum rotation. The timing signals are passed from the drum timing track section through read and write circuits to the computer timing circuits which are used to synchronize operations by gating signals at local circuit positions throughout the computer.

Figure 2:
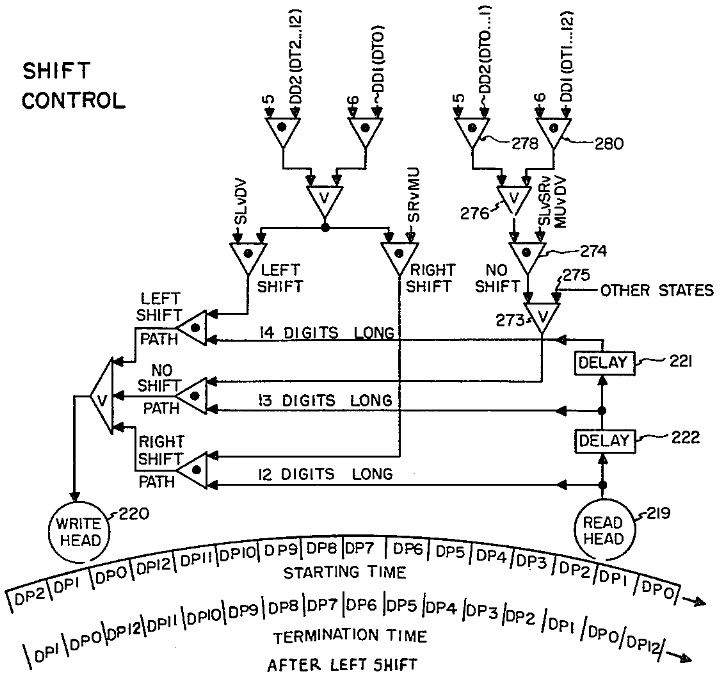
FIG. 2 is a logical schematic diagram of a shift control circuit embodiment of the invention employing a revolving data processing loop.
Figure 3:
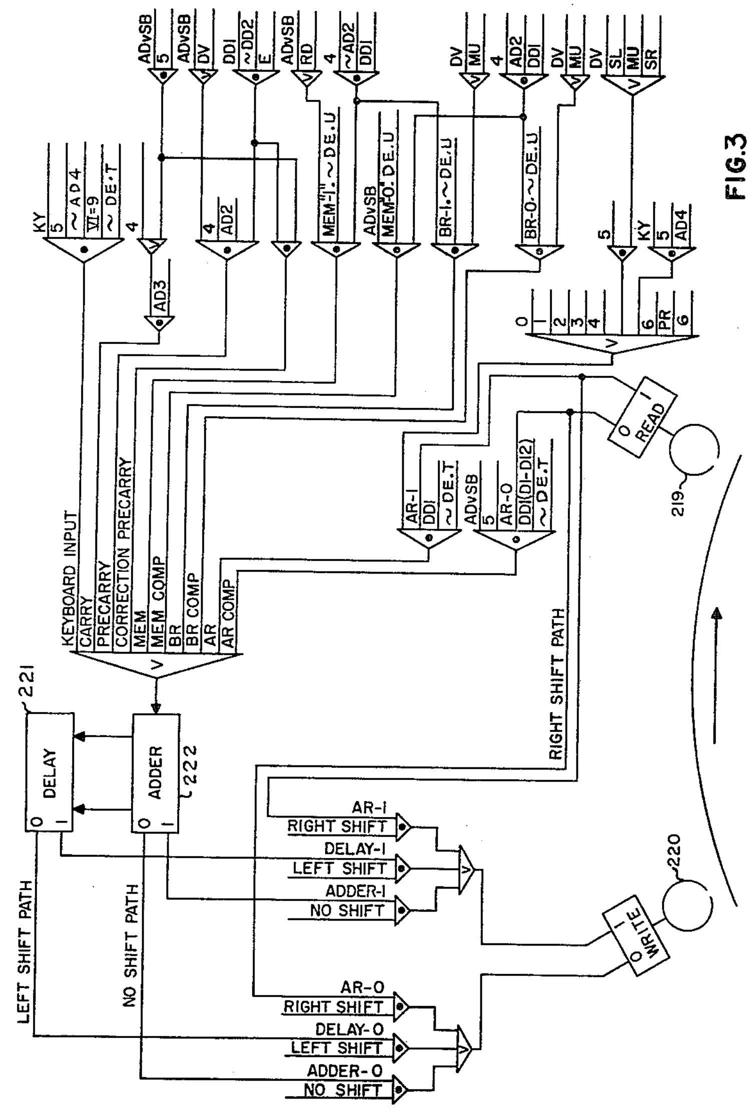
FIG. 3 is a logical schematic diagram of a shift control and accumulator circuit of the invention.

For translation of data between the rotating memory and other computer units all data is processed through suitable read and write control circuits to the accumulator of FIGURES 2 and 3. The accumulator principally comprises a serial pulse-count adder circuit 222, which is coupled in a loop circuit with the A register memory track through the shifting circuits and a writing head.

Figure 4:
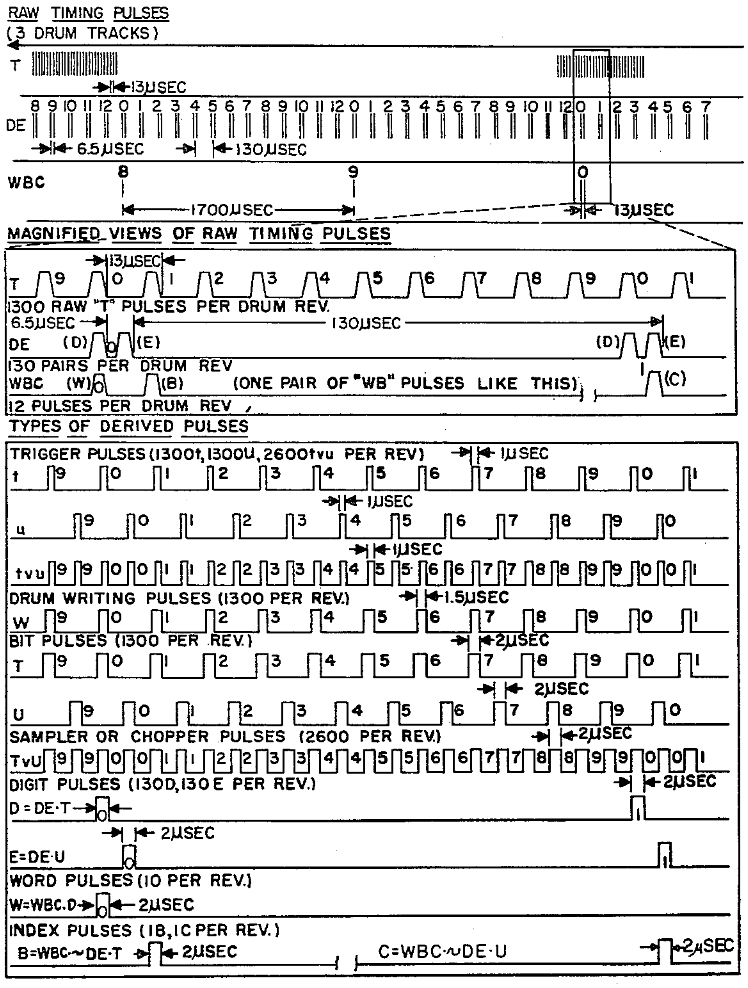
FIG. 4 is a waveform chart illustrating timing pulse relationships as utilized in accordance with the teachings of the invention.

All of the arithmetic operations are timed by means of signals derived from stored timing signals in the memory section of the drum and processed in the timing circuits of FIG. 5. The corresponding waveforms are illustrated in FIG. 4 and detailed schematic circuits are found in the above mentioned co-pending application. The block diagram circuits of FIG. 5 are discussed hereinafter together with timing pulse characteristics of both the raw recorded pulses and those timing pulses derived therefrom as indicated by the waveforms of FIG. 4.

The basic timing track has 1300 raw timing pulses T spaced at thirteen microsecond intervals which are used to derive pulses for synchronous operation of the computer at bit frequencies of either 78,000, or 156,000 cycles per second. The raw timing pulses T are used in the basic timing section 130 for deriving a series of shaped pulses *t, u, tvu,* T, U, T*v*U, and *w*. The timing and widths of these pulses, together with an indication of the timing of the decimal pulses count notation in the computer system are seen in the waveforms of FIG. 4. From the corresponding letter notation at the output leads of the basic timing section 130 each timing signal may be traced back to the basic timing track through the processing circuits.

Thus, the raw basic timing pulses T at input terminal W are fed through the two stage tuned amplifier circuit 134 to produce a sine wave output signal at terminal C′. Shaping of the sine wave signal at terminal C′ is performed by overdriving a biased triode amplifier 132 in a circuit providing lowered plate potential. This effectively converts the sine wave output signal of the intermediate tuned amplifier 134 to a shaped wave at the output terminal Y of the overdriven shaping amplifier 132, from which is derived in further circuits the one microsecond wide *t* and *u* pulses of FIG. 4.

The shaped wave at terminal Y is further processed in a pentode amplifier tube 136 which serves as a further peaking circuit to produce at the output terminal K the *t′* timing pulse. The peaking is done in a damped resonant pulse forming circuit.

To form the *u′* timing pulse at terminal L, an inverter circuit comprising the triode amplifier 140 amplifies the reverse half of the sine wave from terminal Y to produce an input signal to a similar peaking circuit 136 to produce at the output terminal L the shaped *u′* timing waveform. Thus, by utilizing the reverse half cycle of the available shaped sine wave from terminal C′, the *t* and *u* clock pulses are caused to be interspersed with each other, as shown in FIG. 4.

The 1.5 microsecond *w′* drum writing signal is derived also from the 13 microsecond sine wave signal at terminal C′ (FIG. 5). The input circuit of the overdriven amplifier 132 in the *v* signal processing circuit is shaped by means of a suitable phase advancing circuit 146 which causes the *w′* timing pulse to have a leading edge starting one-half of a microsecond before the corresponding *t′* pulses. The damped resonant pulse forming circuit is tuned to produce a one and a half microsecond pulse. Thus, the *w′* pulses last for a duration of one and a half microseconds, and are therefore suitable for actuating circuits for writing upon the magnetic drum. In the computer system, these wider writing pulses permit synchronous retiming of gated pulses read from the drum. The peaker stage 136 further shapes the *v′* waveform to produce output pulses *w′* at terminal M.

The further two microsecond wide clock pulses T′ and U′ are derived from the sine wave produced at the input terminal C′. A cathode follower circuit 144 couples the sine wave signal to two separate processing channels for the respective clock pulses T′ and U′. An inverter circuit 140 serves to intersperse the U′ pulses with the T′ pulses by utilizing a different half cycle of the sine wave input signal. By means of the interspersed phase advancing circuits 146, the sine wave signal is caused to trigger off the overdriven amplifiers 132 soon enough to cause the T′ and U′ pulses to be derived for two microseconds of which the later microsecond corresponds with the *t′* and *u′* trigger pulses. The pulses are finally shaped in the peaker circuits 136 to produce at the respective output terminals X and Ⓣ the shaped T′ and U′ pulses.

Some of those circuits described in connection with the basic timing processing circuits are likewise used for processing the other timing track and data track signals in sections 150, 152 and 178 of FIG. 5. A differentiating amplifier 148 is used in the memory reading stage of the amplifier circuits in reading sections 150, 152 and 178. The pulses are then shaped in the overdriven amplifier to produce output signals.

These shaped signals are further processed through the pulse amplifier circuit 160 as are the signals derived from the basic timing track as indicated in the pulse amplifier circuit portion 161.

Other various combinations of timing pulses which are necessary at different stages of the computer for proper operation are derived in the "and" circuits of the processing section 176 of FIG. 5. Since digital information is handled as pulses throughout the computer system, the data tracks also derive similar shaped pulses in the data section 178.

The drum read-write circuits are shown for the three separate data sections of the magnetic drum. These sections, namely, the memory or data tracks, the A register loop and the B register track each have provisions for reading and writing magnetic information upon the drum. In each of the three data sections similar read and write amplifiers are utilized for writing alternatively 1's and 0's. Since the A register circuit shown in FIGURES 2 and 3 comprises a circulating loop for re-entry of information upon the same memory track after suitable modification, a separate reading head 219 is spaced a fixed distance of about one computer word from the loop writing head 220. However, in the B register and memory sections the same magnetic head winding is used both as a reading and writing head. A single read head and a single write head are coupled with the separate reading and writing circuits of the A register loop. As shown in FIG. 2, the interspersed shifting circuits permit information written on the drum to be shifted in one complete word cycle from a position labelled "starting time" to the position labelled "termination time." Thus a shift of one digit to the left is illustrated, and similarly no shift and right shift operations may take place.

The organization of the data upon tracks of the drum is shown for the B register in the logical diagram of FIG. 1 and appear the same for the data tracks. A typical word as stored upon each drum sector is indicated by the waveform 202. This waveform typifies the words stored and used throughout the computer. As the drum rotates, the first decimal digit DP0, which represents the sign, is presented in each sector. The sign is represented by nine "1" pulses for negative sign and nine "0" signals for a positive sign. In general, a return to negative signal may be used and thereby the negative level or absence of pulse represents a "0" signal.

Between each decimal digit of nine recorded bits is a guard cell so that ten complete recording bit spaces are assigned to each decimal number. Next in succession after the sign digit DP0 is the least significant digit DP1 of the recorded word, which in this illustrative case is a two and is represented therefore by two pulses in the pulse count notation used throughout the system. Each decimal digit is then read in succession until the most significant digit DP12 is reached. For all computations the decimal point is fixed between the most significant digit DP12 and the next lower significant digit DP11. Thus, in the B register track of the drum, the same word would be written in all ten sectors a maximum therefore would be available at the reading head 188 FIG. 1 with an access time of approximately 1.7 milliseconds for a drum revolution of 3600 r.p.m.

Signals to and from the transducing head 188 (FIG. 1) are processed in the read-write circuit section 204 in the manner hereinbefore described with regard to FIG. 5 and in greater detail in the aforementioned copending application, Serial No. 492,062, assigned to the same assignee as the present invention. Separate output signals for both 0 and 1 recorded information, as indicated by the notation BR–0 and BR–1 go to the accumulator adder register 222, FIG. 3, from the shown memory register, the B register. Since the B register is read only during multiplication or division, the "or" circuit 205, FIG. 1, produces signals derived from the computer instructions for actuating the output gating circuits 206 and 207. Coincidence of the multiply or divide instruction with information BR–1 or BR–0 on the B register and clock pulses ~DE.U produce corresponding output signals which are sent to the accumulator. Therefore, during the receipt of clock pulses ~DE.U, shown in FIG. 4, which occur during presentation of each of the recorded sectors of the B register, any recorded B register information is read out into the accumulator in response to a multiply or divide signal received at the input "or" circuit 205.

The accumulator register together with the accompanying shifting circuits is shown in logical form in FIG. 2 to indicate the manner of circulation and modification of information picked up at the reading head 219 and rewritten at one recording position by the single writing head 220. Each word as stored in the entire accumulator loop has 12 decimal digits plus a sign compartment. During regeneration of the information the word sign is stored in a flip flop circuit to leave the sign compartment blank. During normal circulation one of the thirteen digits is stored in the control circuit path which includes delay means 222 for normal no-shift operation, and the other twelve are recorded on the drum surface located between the read and write heads 219 and 220. The provision for storage of one digit in a decimal counter delay line 222 in the control circuits enables precession of information about the accumulator loop. This provides the shift right operation when direct coupling bypasses the one digid delay. An additional delay line 222 of one digit in a further decimal counter may be incorporated in an alternate control circuit path which includes delay means 221 enables shift left sequencing. The result of the left shift operation is indicated in FIG. 2 by the comparison of the two words located between the read heads at the starting and termination of one shift period. The normal accumulator circulation path is from the read head 219 through the normal one digit delay circuit 222 through the no-shift path and back to the write head 220 as controlled by a no-shift input instruction through the "or" circuit 273. The no-shift signal is derived from computer circuit logic in response to various input conditions at the "or" circuit 273, as described in the copending application hereinbefore mentioned.

During precession, automatic entry of zeros may take place without extra equipment because of the previous recording of 0's or the blank in the sign compartment. This in the sine position may be recorded in the lowest order digit (DP1) during the shift left operation since the delay line 222 holds the digit in position (DP1) and the delay line 221 holds the sign digit in position 0 (DP0) at starting time of each word. Thus by selecting sequentially the no shift path and the left shift path for a left shift operation, the zero digit position (DP0) is stored in two successive positions at termination time representing zeros in the least significant digit and sign pulse positions. Likewise in connection with the right shift operation the zero digit position (DP0) will replace the most significant digit position (DP12).

As seen from the waveforms of FIG. 4, the drum writing pulses *w* are formed with a leading edge occurring before that of the corresponding clock pulses *t*. This overlap retiming serves the purpose in the shift control circuits of FIG. 2 of making the regenerative drum loop head spacing and circuit delay configuration less critical. Should the data be recirculated without retiming, even a very small change in timing caused by either advancing or delaying the pulses in any of the three optional circuit loops might cause enough precession or mistiming to be built up to cause erroneous circuit operation, especially when transferring signals from one circuit path to another. Thus, the longer drum writing pulses overlap signals from the reading head 219 to produce a wide enough signal to be gated precisely at the desired time so that, if the heads are accurately spaced, small variations of timing in the three circuits in either direction will be corrected by the retiming action. Either a delay or advance of pulse timing may be caused by misplacement of the heads. Normally some delay is caused in electrical interconnecting circuits causing pulse timing to be slightly retarded. By causing the leading edge of the *w* pulses to occur prior to the timing pulses *t*, the timing variation tolerance in the shift paths even may be advanced and operation of the regenerative shift control circuits thus is made reliable during either delay or advance without the necessity for strict custom adjustments of delay lines in the respective circuit paths.

In FIG. 3, the entire accumulator loop is denoted together with an adder circuit and its plurality of input conditions as described in the above mentioned copending application, and which is not herein described in detail since the various input signal considerations are not necessary to an understanding of the present invention. In this circuit the adder 27 presents the necessary one digit delay required in the no-shift path.

Having therefore disclosed hereinbefore features not heretofore known in the art, the appended claims are directed to those features of novelty believed to define the nature of the present invention.

What is claimed is:

1. In a magnetic drum shift register device, two single transducer heads mounted in spaced apart relation adjacent to the periphery of said drum, three separate loops each providing a selectable regenerative path connectible between said transducer heads comprising respectively a left shift path, a right shift path and a no shift path, and control gating means for selecting one of said regenerative paths between said transducer heads whereby shifting operations are performed.

2. In a data recording apparatus, shift control circuits comprising a revolving memory loop having a magnetic memory data track and two single transducer heads spaced apart along the track substantially the number of digits to be recorded in the loop, three separate circuit loops providing respectively: a first circuit path connectible between said heads, a second circuit path connectible between said heads and providing delay wherein said second path and said magnetic memory data track together provide delay for all digits to be recorded, a third circuit path connectible between said heads and providing greater delay than said second path, and control means for selecting one of said three circuit paths whereby shifting operations are performed.

3. In an electronic computer system, a revolving memory loop on a moving magnetizable medium, a transducer head for reading from said loop, a transducer head for writing on said loop, three separate loop circuits each providing a separate regenerative path connectible between said read transducer head and said write transducer head comprising respectively left shift, right shift and no shift paths, shift control circuits connected in said loop circuits and responsive to signals from the computer system for connecting a selected one of said paths to the heads whereby information received by the write head from the read head is selectively shifted or not shifted depending upon the regenerative path selected.

4. In an electronic computer system, a revolving memory lane on a moving magnetizable medium, a single reading means for reproducing signals from data stored in said lane of the magnetizable medium, a single writing means for introducing data onto said magnetizable medium regeneratively recording signals read from said memory lane, three separate and optionally selectable data processing circuits each having a different time delay, control circuit means for selecting one of said data processing circuits and coupling the same between said reading and writing means for precessing data on said revolving memory lane.

5. In a data storage apparatus, a movable member having a magnetizable surface, two single transducer heads spaced apart and adjacent to said surface, three separate loop circuits each including a separate regenerative path connectible between said transducer heads comprising respectively left shift, right shift and no shift paths, and shift control circuit means for coupling one of said regenerative paths between said transducer heads forming a regenerative closed loop whereby shifting operations are accomplished.

6. In an electronic computer system, a revolving memory loop on a moving magnetizable medium, a transducer head for non destructive reading from said loop, a transducer head for destructive writing over information formerly written on said loop, three separate circuit loops each providing a separate regenerative path connectible between said read transducer head and said write transducer head comprising respectively left shift, right shift and no shift paths, shift control circuits connected in said circuit loops and responsive to signals from the computer system for connecting a selected one of said paths to the heads whereby information received by the write head from the read head is selectively shifted or not shifted depending upon the regenerative path selected.

7. In an electronic computer system, a revolving memory loop on a moving magnetizable medium for storing a fixed number of digits, a transducer head for reading from said loop, a regeneration transducer head for writing on said loop, three separate loop circuits each providing a separate regenerative path connectible between said read transducer head and said write transducer head in series with said memory loop, said first path comprising means for delaying at least a single digit, said second path comprising means for delaying at least two digits, and said third path comprising means for delaying no digits, and shift control circuit means connected to said regenerative paths and responsive to signals from the computer system for connecting a selected one of said paths to the heads whereby information read by said read head may be routed through different ones of said paths and the time required for regeneration may be selectively varied.

8. In an electronic computer system, a revolving memory loop on a movable magnetizable medium for serially recording a word having a plurality of digits, a transducer head for reading from said loop, a transducer head for writing on said loop, three separate circuit loops each including a separate regenerative path connectible between said read transducer head and said write transducer head, including respectively a path having delay means equivalent to one digit time, a path having delay means equivalent to two digit times and a path having no delay means, each of said delay means including a decade counter for serial read-in and serial read-out, and shift control circuit means connected to said regenerative paths and responsive to signals from the computer system for a selected one of said paths to the heads whereby information received by the write head from the read head is selectively delayed or not delayed, depending upon the regenerative path selected.

9. In an electronic computer system, a revolving memory loop on a moving magnetizable medium for serially recording a word having N number of digits, a transducer head for reading from said loop, a transducer head for writing on said loop, said heads being spaced apart from each other a distance equivalent to N −1 digits, three separate circuit loops each providing a separate regenerative path connectible between said read transducer head and said write transducer head, including respectively a path having no time delay, a path with delay means having a time delay equivalent to one digit and a path with delay means having a time delay equivalent to two digits, said time delay means including an adder counter for serial read-in and serial read-out, timing signals of discrete width synchronized with said revolving memory loop and occurring simultaneously with said words for retiming digits introduced by said writing transducer head, and shift control circuit means connected to said regenerative paths and responsive to signals from the computer system for connecting a selected one of said paths to the heads whereby information received by the write head from the read head is selectively delayed or not delayed, depending upon the regenerative path selected.

10. The combination defined in claim 7 wherein each of said means for delaying includes flip-flop cascade counters for serial read-in and serial read-out.

References Cited in the file of this patent

UNITED STATES PATENTS

| | | |
|---|---|---|
| 2,609,143 | Stibitz | Sept. 2, 1952 |
| 2,716,159 | Flowers | Aug. 23, 1955 |
| 2,718,356 | Burrell et al. | Sept. 20, 1955 |
| 2,729,809 | Hester | Jan. 3, 1956 |
| 2,770,797 | Hamilton et al. | Nov. 13, 1956 |
| 2,793,344 | Reynolds | May 21, 1957 |
| 2,845,609 | Newman | July 29, 1958 |
| 2,954,166 | Eckdahl | Sept. 27, 1960 |

FOREIGN PATENTS

| | | |
|---|---|---|
| 1,084,147 | France | June 30, 1954 |
| 749,836 | Great Britain | June 6, 1956 |